United States Patent [19]

Muller et al.

[11] Patent Number: 5,250,784
[45] Date of Patent: Oct. 5, 1993

[54] METHOD AND DEVICE FOR CUTTING A MULTILAYER ASSEMBLY COMPOSED OF A PLURALITY OF THIN FILMS AND COMPRISING A THIN FILM ELECTROCHEMICAL GENERATOR OR A COMPONENT PART THEREOF

[75] Inventors: Daniel Muller, Pau, France; Bruno Kapfer, Longueil, Canada

[73] Assignees: Societe Nationale Elf Aquitaine, Courbevoie, France; Hydro-Quebec, Montreal, Canada

[21] Appl. No.: 768,551
[22] PCT Filed: Jan. 29, 1991
[86] PCT No.: PCT/FR91/00051
§ 371 Date: Oct. 24, 1991
§ 102(e) Date: Oct. 24, 1991
[87] PCT Pub. No.: WO91/11287
PCT Pub. Date: Aug. 8, 1991

[30] Foreign Application Priority Data

Jan. 30, 1990 [FR] France ............... 90 01049

[51] Int. Cl.$^5$ ............................................. B23K 26/00
[52] U.S. Cl. ............................ 219/121.72; 219/121.84
[58] Field of Search ................ 219/121.67, 121.72, 219/121.84

[56] References Cited

U.S. PATENT DOCUMENTS

| | | | |
|---|---|---|---|
| 3,917,769 | 11/1975 | Gadessaud et al. | 264/28 |
| 4,048,464 | 9/1977 | Gale et al. | 219/121.72 |
| 4,149,918 | 4/1979 | Cislak | 156/88 |
| 4,332,999 | 6/1982 | Wittke | 219/121.69 |
| 4,639,572 | 1/1987 | Gruzman et al. | 219/121.67 |
| 4,680,442 | 7/1987 | Bauer et al. | 219/121.67 |
| 4,782,208 | 11/1988 | Withrow et al. | 219/121.72 |
| 4,897,917 | 2/1990 | Gauthier et al. | 29/623.3 |

FOREIGN PATENT DOCUMENTS 224113 6/1987 European Pat. Off. .
2616970 12/1988 France .

OTHER PUBLICATIONS

Patent Abstracts of Japan vol. 6, No. 182 (E-131) (1060), 18 Sep. 1982, & JP-A-57 96472 (Hitachi Maxell K.K.) 15 Jun. 1982.

*Primary Examiner*—C. L. Albritton
*Attorney, Agent, or Firm*—Oblon, Spivak, McClelland, Maier & Neustadt

[57] ABSTRACT

At least one laser beam is focused on one side of an assembly to be cut at a point on the side which is part of the cutting profile and which is called the point of impact of the beam on side side, in order to cause at that point a disintegration of the material of the assembly. The laser beam is moved in relation to the assembly so that the impact point describes a trajectory which corresponds to the desired cutting profile, while maintaining a controlled atmosphere in the area around the impact point. Uses particularly include cutting solid polymer electrolyte lithium thin film electrochemical generators, or cutting precursors of such generators.

20 Claims, 1 Drawing Sheet

METHOD AND DEVICE FOR CUTTING A MULTILAYER ASSEMBLY COMPOSED OF A PLURALITY OF THIN FILMS AND COMPRISING A THIN FILM ELECTROCHEMICAL GENERATOR OR A COMPONENT PART THEREOF

BACKGROUND OF THE INVENTION

The invention relates to a process and a device for carrying out the cutting of a multilayer assembly comprising a plurality of thin layers and consisting of an electrochemical generator in the form of thin layers or of a constituent part of such a generator, the multilayer assembly comprising at least one layer which consists of a metal ribbon or contains a macromolecular material.

A significant group of multilayer assemblies in the form of thin layers, which comprise at least one layer consisting of a metal ribbon or containing a macromolecular material, is that comprising electrochemical current generators in the form of thin layers, which generators may or may not be rechargeable, amongst which mention may be made of the electrochemical current generators which are described in the publication EP-A-0013199 and use a macromolecular material displaying ionic conduction and consisting of a solid solution of an ionisable alkali metal salt $M^+X^-$, in particular a lithium salt, within a plastic polymer material consisting, at least in part, of one or more polymers and/or copolymers of monomers comprising at least one heteroatom, in particular oxygen or nitrogen, capable of forming bonds of the donor/acceptor type with the cation $M^+$.

In their simplest structure, the electrochemical generators in the form of thin layers, as described above, are formed of an elementary multilayer assembly comprising a solid polymer electrolyte layer, comprising a macromolecular material displaying ionic conduction as mentioned above, inserted between a positive electrode layer, which may consist, in particular, of a mixture of a substance displaying electron conduction, such as carbon black, with various electrochemically active materials, and a negative electrode layer, formed, for example, from a ribbon of an alkali metal, in particular lithium, or an alloy based on an alkali metal, the elementary- assembly being arranged as a sandwich between two current collectors, which may be metal collectors or metallized plastic collectors. In certain configurations, the negative electrode consisting of a pure or alloyed alkali metal ribbon may itself be simultaneously the negative electrode and the corresponding current collector of the said elementary assembly.

In order to obtain generators of high energy capacity calling for relatively large surface areas, either flat stacks, or windings or various foldings of the elementary multilayer assembly are produced.

It is also possible to produce a base multilayer assembly comprising a layer of a metal of low ductility and, in this order and on the same side of the layer, a first positive electrode layer, a first solid polymer electrolyte layer, a negative electrode layer, a second solid polymer electrolyte layer, a second positive electrode layer and a peelable protective plastic film. By winding or folding the base multilayer assembly or by stacking such a multilayer assembly, after removing the peelable film, it is possible to obtain electrochemical generators of high energy capacities.

The electrochemical generators in the form of thin layers, which are subsequently subjected to the folding, winding or stacking operations in order to form generators of high energy capacity, may be assembled from the various layers, intended for forming them, taken separately, or from multilayer sub-assemblies already combining several of the constituent layers, these assembly operations being carried out continuously. In particular, it is possible to assemble the electrochemical generators in the form of thin layers as described in the publications FR-A-2616970 and FR-A-2616971.

Cutting operations are involved during the production of the electrochemical generators in the form of thin layers and these cutting operations may be carried out either on the complete electrochemical generators or on the constituent parts of the generators.

The cutting operations carried out making use of conventional cutting techniques by shearing with the aid of knives or by punching with a punch have various disadvantages. Firstly, the tool used always gives rise to strain at the point of cutting, which is reflected in time by a local deformation and therefore a significant risk of short-circuiting, with the consequence that cutting of the components must preferably be carried out before assembly of the generator. Moreover, the polymer materials and the metals, in particular alkali metals, which are involved in the composition of the components of the generators, lead to rapid fouling of the cutting tools, knives or punches. Finally, cutting may be carried out only in one direction if carried out in continuous operation. In the case of cutting in several directions, a complex movement either of the tool or of the multilayer assembly to be cut is required in order to carry out such an operation.

Moreover, the use of a cutting technique using a jet of water must be excluded taking account of the presence of alkali metal and in particular of lithium or of an alloy of such a metal in the negative electrode layer of the electrochemical generator.

SUMMARY OF THE INVENTION

It has now been found that it was possible to overcome the disadvantages of the abovementioned cutting techniques by using a process for cutting complete electrochemical generators or their constituent parts using a laser beam.

An operation of this type may be carried out easily and continuously and because of this it may be easily integrated into the chain of operations for production of the electrochemical generators. In particular, it allows the production of such generators in various shapes, that is to say for different applications, from a single supply of assembly to be cut, without it being necessary to modify the production line. For this purpose, cutting does not have to take place solely in the longitudinal direction but in fact corresponds to a predefined complex outline where there is relative movement of the laser beam and the assembly to be cut. Moreover, cutting to the final shape may be carried out after assembly, which enables the number of cutting steps during the process for assembly of the generator to be reduced. In addition, the laser beam does not cause any strain in the materials of the generator at the point of cutting and, therefore, no deformation is produced which is liable to give rise to short-circuits. Finally, the cutting according to the invention takes place without direct contact between a tool and the materials to be cut and because of this, whatever the materials to be subjected to cutting, there is no fear of any risk of fouling of the tool.

The process according to the invention for carrying out the cutting, to a desired shape, of a multilayer assembly comprising a plurality of thin layers and consisting of an electrochemical generator in the form of thin layers or of a constituent part of such a generator, the multilayer assembly comprising at least one layer which is formed from a metal ribbon or contains a macromolecular material, is characterized in that at least one laser beam is focused on one of the faces of the assembly to be cut, at a point on this face lying on the outline to be cut out and termed point of impact of the beam on the said face, so as to produce at this point a point disintegration of the material of the assembly, the laser beam is driven in a relative movement with respect to the assembly to be cut such that the point of impact describes a trajectory corresponding to the outline to be cut out, while maintaining a controlled atmosphere in a zone surrounding this point of impact.

The relative movement of the laser beam with respect to the assembly to be cut may be produced either by keeping the laser beam immobile and moving the assembly to be cut or by moving the laser beam and keeping the assembly to be cut immobile, or by moving both the laser beam and the assembly to be cut.

The laser beam which may be used in the process according to the invention may be a continuous beam or a pulsed beam. It may be emitted by any of the laser sources of appropriate power, for example a gas laser source, a laser source of the semiconductor type, a solid laser source or an organic dye laser source. Gas laser sources, for example $CO_2$ laser sources, having a power of less than 1000 W and in particular of between 0.5 and 600 W are particularly suitable.

The cutting speed, which corresponds to the speed of relative movement of the point of impact of the laser beam on the face of the assembly to be cut, may vary fairly widely depending on the energy contained in the laser beam, the energy depending on the power of the laser source used. Thus, the cutting speed may range, in particular, from about 1 cm/s to 1 m/s.

The controlled atmosphere created at the point of cutting, that is to say in the zone surrounding the point of impact of the laser beam on the face of the assembly to be cut, is advantageously produced by blowing, at this point, a gas having the desired characteristics. Thus, the atmosphere may be inert with respect to the components of the multilayer assembly, making use of a gas, for example argon, which has no action on the components. It is also possible to create, at the point of cutting, an atmosphere which reacts with at least one of the components of the multilayer assembly in order to form a protective layer on the slice of the cut part, it being possible for the said layer to be, by means of appropriate choice of the constituents of the reactive atmosphere, either electronically insulating or ionically insulating or both electronically and ionically insulating. In particular, the reactive controlled atmosphere may contain a controlled amount of a gaseous oxidizing agent such as oxygen. In the case of multilayer assemblies of the type comprising electrochemical generators in the form of thin layers containing lithium or precursors of such generators, it is possible advantageously to use a reactive atmosphere consisting of $CO_2$ alone or of an inert gas, in particular argon, containing a controlled amount of $CO_2$, or of $CO_2$ and oxygen in order to form a layer of electrochemically inert lithium carbonate. If the formation of the protective layer at the point of cutting requires the presence of a gaseous oxidizing agent, in particular oxygen, in the reactive atmosphere, the concentration of this gaseous oxidizing agent in the gas intended for forming the reactive atmosphere is chosen so as to permit the formation of chemical compounds making up the desired protective layer without this reactive atmosphere becoming totally oxidizing.

As indicated above, the process according to the invention applies to the cutting of diverse types of complete electrochemical generators in the form of thin layers, the generators being, in particular, lithium-based electrochemical generators containing solid polymer electrolyte or, for cutting constituent parts of such generators and, for example, sub-assemblies comprising, in this order, a current collector in the form of a ribbon of a metal such as nickel, copper or aluminum, or of a metallized film of a plastic material such as polypropylene or polyethylene, a positive electrode layer and a solid polymer electrolyte layer, or intermediate negative electrode precursor assemblies comprising a thin film of lithium inserted between two films of inert plastic material, for example polypropylene or polyethylene, one of which is easily peelable and the other having a controlled adhesion to lithium.

If the multilayer assembly to be cut, that is to say the complete electrochemical generator or constituent part of the generator, contains a layer or a conspicuous deposit of aluminum or copper, the attack of the laser beam on the multilayer assembly preferably takes place from the side opposite to that containing the layer or conspicuous deposit of aluminum or copper. If the two sides of the multilayer assembly each carry a layer or a conspicuous deposit of aluminum or copper, the procedure used is to cover one of the sides using a film made of a peelable inert plastic material, for example polypropylene or polyethylene, and then to carry out the attack by the laser beam on the multilayer assembly from the side thus covered by the film of plastic material. On the other hand, if the multilayer assembly carries a layer or a conspicuous deposit of nickel, the attack on the multilayer assembly may take place directly from the side carrying the nickel layer or deposit.

A device for carrying out the cutting of a multilayer assembly comprising a plurality of thin layers and consisting of an electrochemical generator in the form of thin layers or of a constituent part of such a generator, the multilayer assembly comprising at least one layer which is formed from a metal ribbon or contains a macromolecular material, is characterized in that it comprises at least one source emitting a laser beam in combination with a system for focusing the laser beam emitted by the source, support means for the multi-layer assembly to be cut, arranged so as to define a support plane passing substantially through the focusing point of the laser beam, the plane being advantageously perpendicular to the axis of the laser beam after focusing, means for blowing a gas, comprising an injection nozzle opening into a zone located between the focusing system for the laser beam and the focusing point of the beam in the vicinity of the said point, and means for ensuring the movement and/or the pivoting of the assembly formed by the source emitting the laser beam and the associated system for focusing the said beam or/and for ensuring the movement of the multilayer assembly.

The source emitting the laser beam, or laser source, may consist of any of the laser sources defined above and, for example, of a gas laser source, such as a $CO_2$ laser source. The focusing system associated with the laser source is generally a system equipped with lenses, but a focusing system having a concave mirror may also be envisaged. The assembly formed by the laser source and the focusing system may be fixed or, by combination with conventional mechanical means, may be rendered pivotable or/and moveable.

Support means for the multilayer assembly may in particular consist of a plate which has a through-aperture into which the focused laser beam passes, the face of the plate facing the focusing system defining the support plane and the laser beam being focused substantially on this plane. If the laser source is pivoting or/and moveable or if several laser sources are used, the support plate may advantageously consist of a grating, the laser beam or beams used being able to pass into the apertures of the grating. In one variant, the support plate may be replaced by two pairs of rollers, the multilayer assembly to be cut passing between the rollers of the pairs and the pairs of rollers being arranged on either side of the focused laser beam such that the plane determined by the contact generatrices of the rollers of each of the pairs of rollers passes substantially through the focusing point of the laser beam and thus defines the support plane of the multilayer assembly, the plane being advantageously perpendicular to the axis of the laser beam after focusing. It is also possible to combine the use of the support plane and the two pairs of rollers in order to form support means for the multilayer assembly, the plate then being arranged between the pairs of rollers.

If the cutting device is provided with means for ensuring movement of the multilayer assembly, the means may comprise winding devices which are driven in rotation by a motor and on each of which a strip resulting from the cutting of the multilayer assembly winds.

The cutting device may also comprise a fume exhaust system comprising an exhaust orifice, the inlet of which is arranged below the support means for the multilayer assembly facing the focusing point for the laser beam and the outlet of which is connected by a pipe to exhaust means.

DESCRIPTION OF THE PREFERRED EMBODIMENTS

Figure 1:
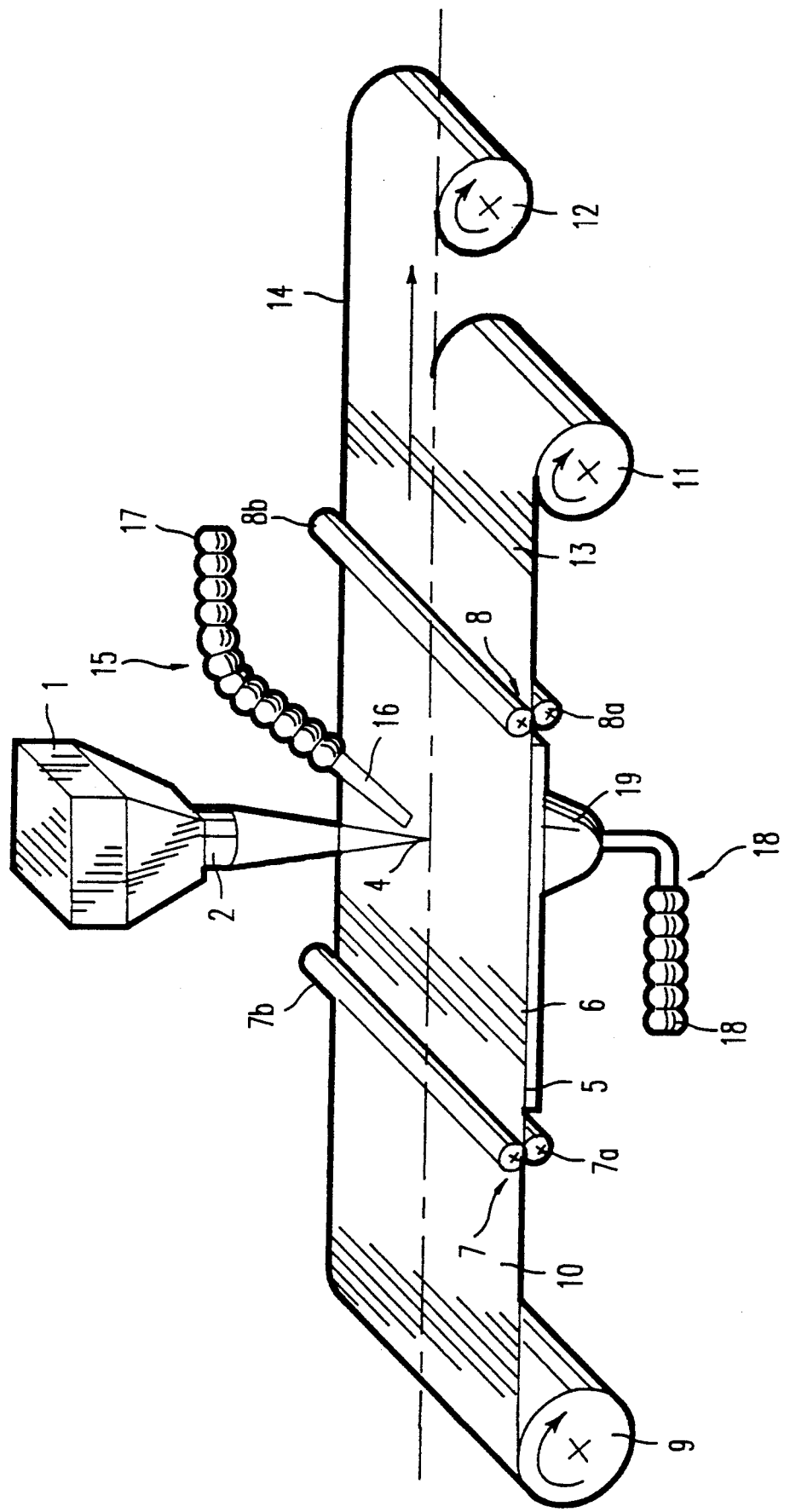

Other advantages and characteristics of the invention will become apparent on reading the following description of one embodiment of the invention, which is given by way of illustration and is non-limiting, with reference to the figure of the appended drawing showing diagrammatically a device for cutting a multilayer assembly.

The device shown diagrammatically in the figure comprises a laser source 1, for example a gas laser source, in combination with a lens-based focusing system 2, which focuses the coherent light beam emitted by the laser at a point 4. A support plate 5 is arranged in such a way, below the focusing system 2, that the plane upper face 6 of the plate 5 contains the focusing point 4 of the laser beam and that the face 6 is essentially perpendicular to the axis of the focused laser beam. An aperture, surrounding the focusing point 4 and through which the laser beam passes, passes through the plate, 5 this arrangement being in order to prevent the plate 5 from being attacked by the laser beam. A pair 7 of rollers 7a and 7b and a pair 8 of rollers 8a and 8b are arranged on either side of the plate 5 in such a way that the axes of the rollers are parallel to one another in each pair and from one pair to the other and that the plane determined by the contact generatrix of the rollers 7a and 7b of the pair 7 and the contact generatrix of the rollers 8a and 8b of the pair 8 contains the face 6 of the plate 5. Each pair of rollers is fitted with conventional means, which are not shown, for controlling the spacing between the rollers of the pair under consideration. A spool roller 9, which is mounted so that it rotates freely about its axis and on which the multilayer assembly 10 which is to be cut is stored, is arranged on one side of the assembly formed by the plate 5 framed by the pairs 7 and 8 of rollers, while a first winding roller 11 and a second winding roller 12, which are driven in rotation by a motor, which is not shown, and onto each of which the strips 13 and 14 ut from the multilayer assembly are wound, are placed on the other side of the assembly, the axes of the spool roller 9 and winding rollers 11 and 12 being parallel to the axes of the rollers of the pairs 7 and 8 of rollers. A system for blowing gas 15 comprises a nozzle 16 arranged in a zone between the focusing system 2 and the focusing point 4 and opening in the vicinity of the said focusing point, this nozzle 16 being connected by a pipe 17 to a gas supply, which is not shown. A fume exhaust system 18 comprises an exhaust orifice 19, the inlet of which is arranged in the underside of the support plate 5, facing the focusing point 4 of the laser beam, and the outlet of which is connected by a pipe 20 to exhaust means, which are not shown. The multilayer assembly 10 to be cut, which is stored on the spool 9, passes between the rollers 7a and 7b of the pair of rollers 7 and bears on the face 6 of the support plate 5, while the strips 13 and 14 formed during cutting of the multilayer assembly 10 by the laser beam pass between the rollers 8a and 8b of the pair 8 of rollers and are then wound, respectively, on the winding devices 11 and 12 driven in rotation by a motor, which ensures a continuous movement of the multilayer assembly 10 and of the cut strips 13 and 14 in the direction of the arrow.

The device described above is used in the following way. The multilayer assembly 10 to be cut, which is stored on the spool 9, is introduced so that it passes between the rollers 7a and 7b of the pair 7 of rollers and between the rollers 8a and 8b of the pair 8 of rollers and the strips 13 and 14 resulting from cutting are wound on the corresponding winding devices 11 and 12, which ensures a continuous movement of the multilayer assembly to be cut, in the direction of the arrow. The laser beam emitted by the source 1 is focused, by the focusing system 2, on the upper face of the multilayer assembly 10 to be cut, that is to say substantially in the plane of the face 6 of the support plate 5, while a gas of controlled composition is blown through the nozzle 16 onto the multilayer assembly in the vicinity of the focusing point 4 of the laser beam and the exhaust means of the exhaust system 18 are connected. The energy contained in the laser beam, which is concentrated at the focusing point of the beam, causes a point disintegration of the material of the multilayer assembly at the point of impact of the beam on the said multilayer assembly, the point of impact being substantially coincident with the focusing point of the laser beam, this causing the laser beam to pass through the multilayer assembly 10 and leading, because of the movement of the multilayer assembly, to cutting of this assembly, in the direction of movement (direction of the arrow), into the two strips 13 and 14. The blowing of the gas through the nozzle 16 maintains a controlled atmosphere in the vicinity of the point of impact of the laser beam on the multilayer assembly, and this enables any ignition of the material of the multilayer assembly to be prevented. The fumes and all of the residues, such as the molten metal formed in the vicinity of the laser beam along the cut, are removed by the combined effect of the blowing of gas through the nozzle 16 and the suction produced by the exhaust system 18.

In order to complete the description of the invention, which has just been supplied, two examples of carrying out cutting according to the invention are given below, without any limitation being implied.

EXAMPLE 1

Cutting experiments were carried out on a complete electrochemical generator in the form of thin layers, the generator being in the form of a multilayer sheet comprising, joined in this order:

a nickel ribbon 10 μm thick as negative electrode collector, a lithium sheet 20 μm thick forming the negative electrode, a solid polymer electrolyte layer 30 μm thick comprising a 10% by weight solid solution of $LiClO_4$ in an ethylene oxide/methyl glycidyl ether copolymer, the said copolymer containing, by weight, 80% of ethylene oxide, a positive electrode layer 20 μm thick formed from a homogeneous mixture of titanium sulphide powder, carbon black and a solid polymer electrolyte identical to that defined above, and an aluminum ribbon having a thickness of 20 μm, as positive electrode collector.

The cutting experiments were carried out using a device having a structure similar to that of the device shown diagrammatically in the figure and comprising a $CO_2$ laser source, the maximum available power of which was about 500 W.

The multilayer generator to be cut was placed on the spool 9 so as to be attacked by the laser beam on the nickel collector side. The gas blown through the nozzle 16 of the blowing system. 15 consisted of dry argon, which led to the creation of a quasi-inert atmosphere in the vicinity of the point of impact of the laser beam on the generator to be cut.

The cutting experiments were carried out using a continuous laser beam or a pulsed laser beam.

A cutting speed of 25 cm/s was achieved for powers of between 300 and 500 W as appropriate.

EXAMPLE 2

Cutting experiments were carried out on an electrochemical generator in the form of thin layers, the generator being in the form of a multilayer sheet comprising, joined in this order:

a protective polypropylene film having a thickness of 20 μm, a first positive electrode layer having a thickness of 20 μm, a first solid polymer electrolyte layer having a thickness of 30 μm, a sheet of lithium 30 μm thick forming the negative electrode, a second solid polymer electrolyte layer having a thickness of 30 μm, a second positive electrode layer having a thickness of 20 μm and an aluminum ribbon having a thickness of 20 μm, as positive electrode collector.

The composition of each positive electrode layer was similar to the composition of the positive electrode described in Example 1. Similarly, the composition of the solid polymer electrolyte corresponded to that indicated in Example 1.

The cutting experiments were carried out using a device having a structure similar to that of the device shown diagrammatically in the figure and comprising a $CO_2$ laser source, the maximum available power of which was about 500 W.

The multilayer generator to be cut was placed on the spool 9 so as to be attacked by the laser beam on the polypropylene protective film side. The gas blown through the nozzle 16 of the blowing system 15 consisted of $CO_2$, which led to the creation of a reactive atmosphere in the vicinity of the point of impact of the laser beam on the generator to be cut.

The cutting experiments were carried out using a continuous laser beam or a pulsed laser beam.

A cutting speed of 25 cm/s was achieved for powers of below 400 W as appropriate.

In addition, the presence of a $CO_2$ atmosphere in the vicinity of the point of impact of the laser beam on the surface of the generator to be cut, that is to say in the cutting zone, leads to the formation of a surface insulating layer of lithium carbonate on the facing slices of the cut strips 13 and 14.

The electrochemical generators cut as indicated in Examples 1 and 2 did not show a significant difference in behavior, during their subsequent use, compared with electrochemical generators of the same composition and geometry for which preliminary cutting of each of the constituent elements had been carried out and the quality of the cut had been confirmed before the final assembly of the elements. In contrast, in the case of similar electrochemical generators cut with the aid of scissors from multilayer sheets identical to those of Examples 1 and 2, the occurrence of short-circuits was observed during prolonged or repeated use.

We claim:

1. A process for carrying out the cutting, to a desired shape, of a multilayer assembly selected from the group consisting of a thin layer electrochemical generator and a constituent part of such a generator, said multilayer assembly comprising a plurality of thin layers at least one of which is selected from the group consisting of a metal ribbon and a macromolecular material containing layer, said process comprising the steps of:

focusing at least one laser beam on a face of the assembly to be cut, at a point on said cancelled face lying on the outline to be cut and termed point of impact and said beam on said face, so as to provide at said point a disintegration of the material of said assembly;

driving the laser beam in a relative movement with respect to the assembly to be cut such that said point of impact describes a trajectory corresponding to the outline to be cut out, while maintaining a controlled atmosphere in a zone surrounding said point of impact; and selecting as the controlled atmosphere a reactive atmosphere which reacts with at least one of the components of the multilayer assembly in order to form a protective layer on a slice of the cut part of the assembly.

2. Process according to claim 1, wherein the relative movement of the laser beam with respect to the assembly to be cut is produced either by keeping the laser beam immobile and moving the assembly to be cut or by moving the laser beam and keeping the assembly to be cut immobile, or by moving both the laser beam and the assembly to be cut.

3. Process according to claim 1 or 2, wherein a continuous laser beam or a pulsed laser beam is used.

4. Process according to claim 3, wherein the laser beam is emitted by a gas laser source, a solid laser source, a semiconductor laser source or an organic dye laser source.

5. Process according to claim 3, wherein the laser beam is emitted by a gas laser source, having a power of less than 1000 W.

6. Process according to claim 5, wherein the cutting speed, which corresponds to the speed of relative movement of the point of impact of the laser beam on the face of the assembly to be cut, has a value ranging from about 1 cm/s to 1 m/s.

7. Process according to claim 1, wherein the reactive controlled atmosphere contains a controlled amount of a gaseous oxidizing agent, the amount being chosen so as to permit the formation of the chemical compound or compounds making up the desired protective layer without the reactive atmosphere becoming totally oxidizing.

8. Process according to claim 7, wherein the multilayer assembly to be cut is a lithium-based electrochemical generator in the form of thin layers containing solid polymer electrolyte or a constituent part of such a generator.

9. A process according to claim 1, wherein said protective layer is electronically insulating, ionically insulating or both.

10. A process according to claim 5, wherein the gas laser source is a $CO_2$ laser source having a power of between 0.5 and 600 W.

11. A process for carrying out the cutting, to a desired shape, of a multilayer assembly selected from the group consisting of a lithium-based thin layer electrochemical generator containing solid polymer electrolyte and a lithium-containing precursor of such a generator, said process comprising the steps of:

focusing at least one laser beam on a face of the assembly to be cut, at a point on said face lying on the outline to be cut and termed point of impact of said beam of said face, so as to provide at said point of disintegration of the material of said assembly;

driving the laser beam in a relative movement with respect to the assembly to be cut such that said point of impact describes a trajectory corresponding to the outline to be cut out, while maintaining a controlled atmosphere in a zone surrounding said point of impact; and selecting as the controlled atmosphere a reactive atmosphere consisting in total or in part of $CO_2$, which reacts with the lithium in the multilayer assembly at the point of cutting to form a protective layer of electrochemically inert lithium carbonate on a slice of the cut part of the assembly.

12. A process according to claim 11, wherein the reactive atmosphere consists of $CO_2$ alone.

13. A process according to claim 11, wherein the reactive atmosphere consists of an inert gas containing an amount of $CO_2$ controlled to form the protective layer of lithium carbonate.

14. A process according to claim 11 or 13, wherein the reactive atmosphere containing $CO_2$ also includes oxygen in a concentration so selected to permit the formation of the protective layer of lithium carbonate without said atmosphere becoming totally oxidizing.

15. A process according to claim 11, wherein the relative movement of the laser beam with respect to the assembly to be cut is produced either by keeping the laser beam immobile and moving the assembly to be cut or by moving the laser beam and keeping the assembly to be cut immobile, or by moving both the laser beam and the assembly to be cut.

16. A process according to claim 11, wherein a continuous laser beam or a pulsed laser beam is used.

17. A process according to claim 16, wherein the laser beam is emitted by a gas laser source, a solid laser source, a semiconductor laser source or an organic dye laser source.

18. A process according to claim 16, wherein the laser beam is emitted by a gas laser source having a power of less than 1000 W.

19. A process according to claim 18, wherein the cutting speed, which corresponds to the speed of relative movement of the point of impact of the laser beam on the face of the assembly to be cut, has a value ranging from about 1 cm/s to 1 m/s.

20. A process according to claim 18, wherein the gas laser source is a $CO_2$ laser source having a power of between 0.5 and 600 W.

* * * * *

UNITED STATES PATENT AND TRADEMARK OFFICE
CERTIFICATE OF CORRECTION

PATENT NO. : 5,250,784
DATED : October 5, 1993
INVENTOR(S) : Daniel Muller et al It is certified that error appears in the above-indentified patent and that said Letters Patent is hereby corrected as shown below:

On the title page, in the abstract, on line 4, change "side" (first occurrence) to —the—.

On the title page, in the figure, two reference numerals "18" appear, the reference numeral "18" on the left-hand side which represents the pipe of the fume exhaust system should be replaced with —20—.

In the drawings, in Fig. 1, two reference numerals "18" appear, the reference numeral "18" on the left-hand side which represents the pipe of the fume exhaust system should be replaced with —20—.

In column 6, line 15, change "ut" to —cut—.
In column 8, line 50, delete "cancelled";
            line 52, change "and" to —of—.
In column 9, line 47, change "of" (first occurrence) to —on—;
            same line, change "of" (second occurrence) to —a—.

Signed and Sealed this

Twenty-fifth Day of October, 1994

Attest:

BRUCE LEHMAN

Attesting Officer        Commissioner of Patents and Trademarks